United States Patent
Ferretti

(10) Patent No.: US 6,199,590 B1
(45) Date of Patent: Mar. 13, 2001

(54) VALVE SYSTEM WITH DIFFERENTIATED FLOW RATES TO BE COMBINED INTO BATTERIES

(75) Inventor: Piero Luigi Ferretti, Villanuova Sul Clisi (IT)

(73) Assignee: Metal Works S.p.A. (IT)

( * ) Notice: Subject to any disclaimer, the term of this patent is extended or adjusted under 35 U.S.C. 154(b) by 0 days.

(21) Appl. No.: 09/490,908

(22) Filed: Jan. 25, 2000

(30) Foreign Application Priority Data

Jan. 27, 1999 (IT) .............................................. MI99A0145

(51) Int. Cl.[7] .................................................... F16K 11/02
(52) U.S. Cl. ........................................... 137/884; 137/270
(58) Field of Search ..................................... 137/270, 884

(56) References Cited

U.S. PATENT DOCUMENTS 4,815,496 * 3/1989 Nishitani et al. ..................... 137/884
5,341,846 * 8/1994 Framberg ............................... 137/884
5,915,409 * 6/1999 Kaneko et al. ........................ 137/884
5,944,056 * 8/1999 Miyazoe et al. ................. 137/625.64

* cited by examiner

Primary Examiner—John Fox
(74) Attorney, Agent, or Firm—Shlesinger, Fitzsimmons & Shlesinger

(57) ABSTRACT

A modular system to form valve batteries comprises a plurality of valve units (11) to be variously packed in side by side relationship to form the battery. Each valve unit has a face (40) on which outlets for the users appear and through ducts (23, 24, 25) appear on lateral sides thereof, which are intended for being juxtaposed and connected with corresponding ducts (23, 24, 25) of units in side by side relationship. The valve units generally are of parallelepiped shape, the sizes of the mating sides (21, 22) being substantially constant for all units and the thickness of each unit varying on varying of the maximum flow rate of the specific valve unit, to enable a direct coupling between valve units having different maximum flow rates.

8 Claims, 2 Drawing Sheets

VALVE SYSTEM WITH DIFFERENTIATED FLOW RATES TO BE COMBINED INTO BATTERIES

BACKGROUND OF THE INVENTION

The present invention relates to a system of modular valves with differentiated flow rates to be combined into compact batteries.

Batteries of pneumatic valves to distribute flows under pressure to different users are known in the art. Batteries are formed of valve units generally of parallelepiped shape. Each valve unit has feeding and exhaust ducts passing through the unit and appearing on opposite side faces of the same. Units can be combined and packed with each other in a variable number by juxtaposing the faces on which the ducts appear, so that corresponding ducts of valves disposed in side by side relationship are in mutual connection. Thus a compact assembly is obtained. Each valve or valve unit is sized for a given airflow. Manufacturers therefore offer several battery models, each having valves of different size.

Valves of different battery models cannot be combined with each other, since the valve sizes vary in all directions on varying of the airflow and consequently also the position of the ducts appearing on the juxtaposition faces varies. When use of valve batteries is concerned, selection of the appropriate battery model conveniently sized for the user requiring the highest flow rate is therefore necessary. Consequently, users of smaller flow rates will be connected with oversized valves. This involves waste of room and increase in costs, above all if there are many users but only a small number of users (even only one user) require the highest flow rate.

In spite of these heavy disadvantages, no solution to the above problem has been hitherto proposed. It is a general aim of the present invention to obviate the above mentioned drawbacks by providing a system of valves to be combined into batteries in which valve units of different flow rate can be variously and freely combined together depending on requirements, while keeping the obtained assembly compact.

SUMMARY OF THE INVENTION

In view of the above aim, in accordance with the invention, a modular system to form valve batteries has been conceived which comprises a plurality of valve units to be variously packed in side by side relationship to form the battery, each valve unit having a face on which outlets for users appear and, on opposite lateral mating sides of which through ducts appear which are intended for juxtaposing and connecting with corresponding ducts of units disposed in side by side relationship, each unit having valve means for controlled connection between the through ducts and the respective outlets, the valve units being made with a generally parallelepiped shape, the sizes of the mating sides being substantially constant for all units and the thickness of each unit intended as the distance between sides varying on varying of the maximum flow rate of the specific valve unit, thereby enabling a direct coupling between valve units having different maximum flow rates.

BRIEF DESCRIPTION OF THE DRAWINGS

For better explaining the innovatory principles of the present invention and the advantages it offers over the known art, a possible embodiment applying these principles will be described hereinafter, by way of example, with the aid of the accompanying drawings. In the drawings.

DETAILED DESCRIPTION OF THE INVENTION

Figure 2:
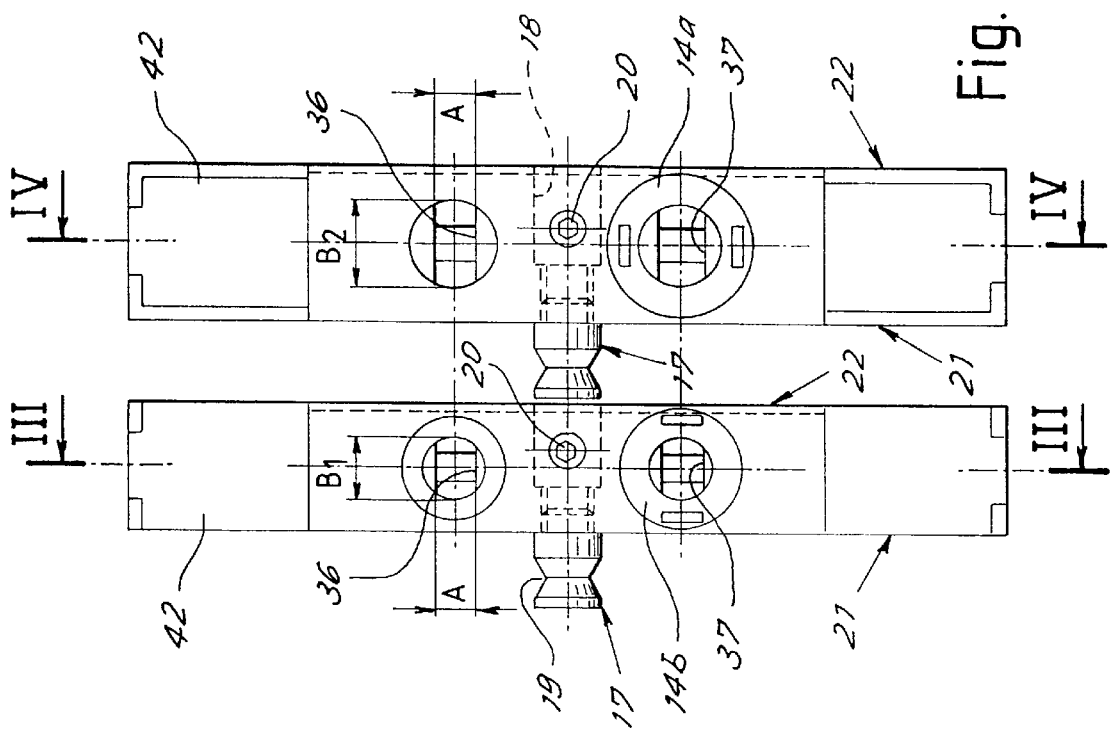
FIG. 2 is an elevation front view of two modular valve units disposed in side by side relationship but not yet connected, some parts being removed.

With reference to the drawings, a valve battery made in accordance with the invention (generally identified by 10) comprises a plurality of modular valve units 11, to be packed with each other in side by side relationship between one feeding head 12 and one closing head 13.

Each valve unit or module 11 has outlets 14 on a front face 42 thereof for connection with movable ducts 41 directed to the users to be supplied. Typically, outlets 14 are two in number for each module. Outlets can be of the known quick-coupling type.

The feeding head 12 in turn comprises main exhaust 15 and feeding 16 couplings.

As shown in FIG. 2, each module has opposite faces or lateral mating sides 21, 22, and is disposed in side by side relationship with the adjacent modules and connected therewith by means of fitting elements 17. In the embodiment shown the fitting means advantageously consists of bushes 17 projecting from one face of each module to be received in a matching housing 18 in the face in side by side relationship therewith. Bushes 17 have a peripheral groove 19, advantageously with a V-shaped section, into which a locking set piece 20 is fitted, which can be operated from the front face of the module for introduction into housing 18.

Figure 1:
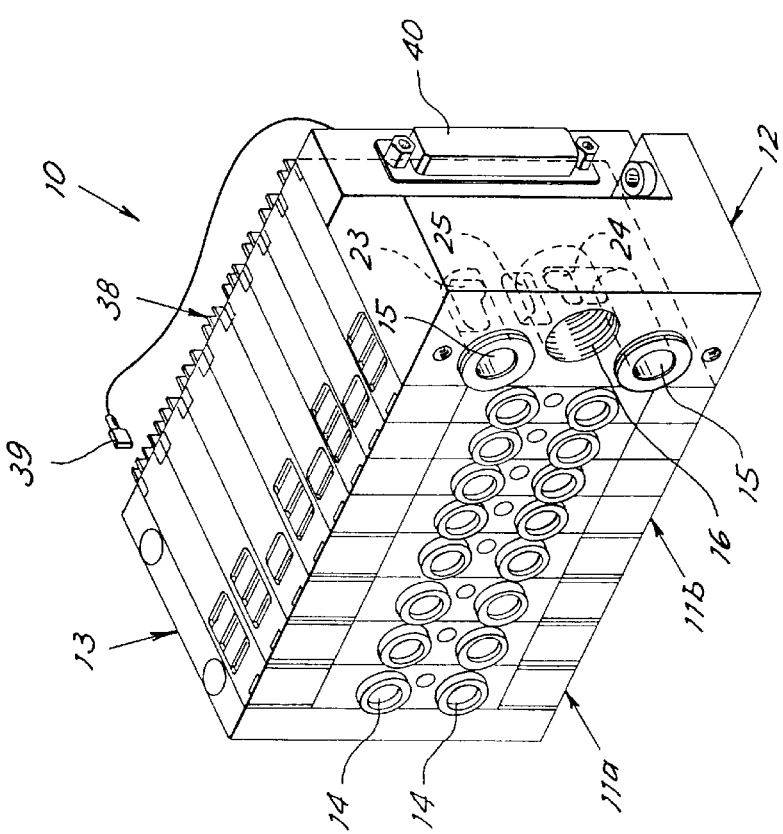
FIG. 1 is a diagrammatic perspective view of a modular-valve battery made in accordance with the invention.
Figure 3:
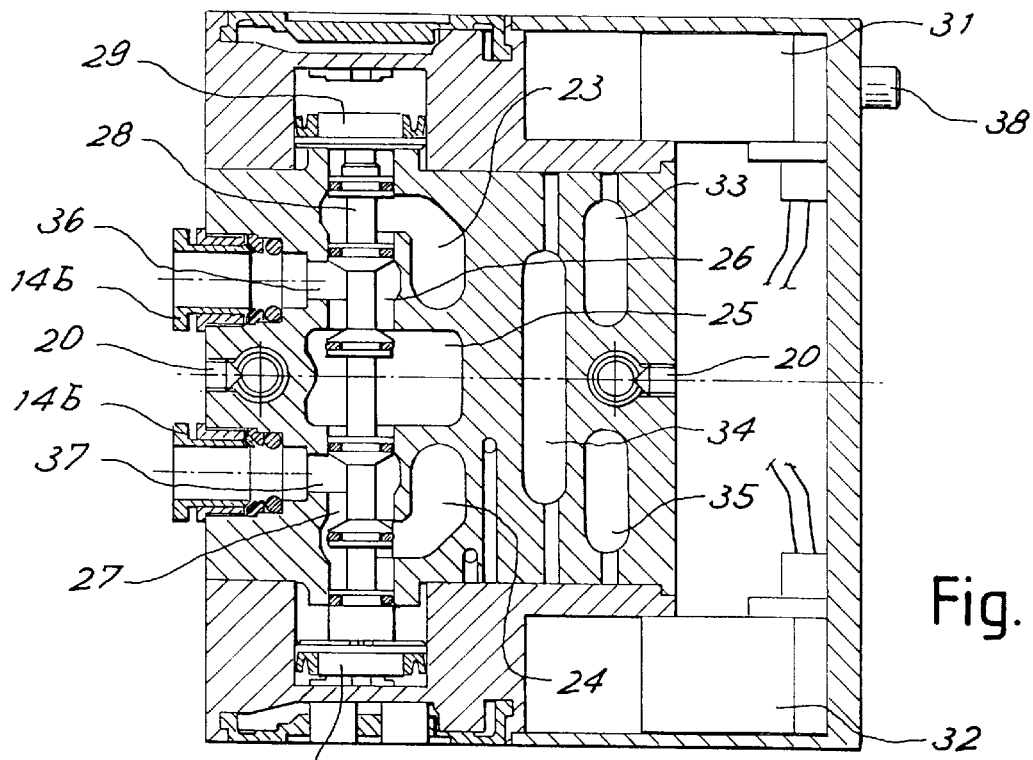
FIGS. 3 and 4 are sectional diagrammatic views taken along lines III—III and IV—IV in FIG. 2, respectively.
Figure 4:
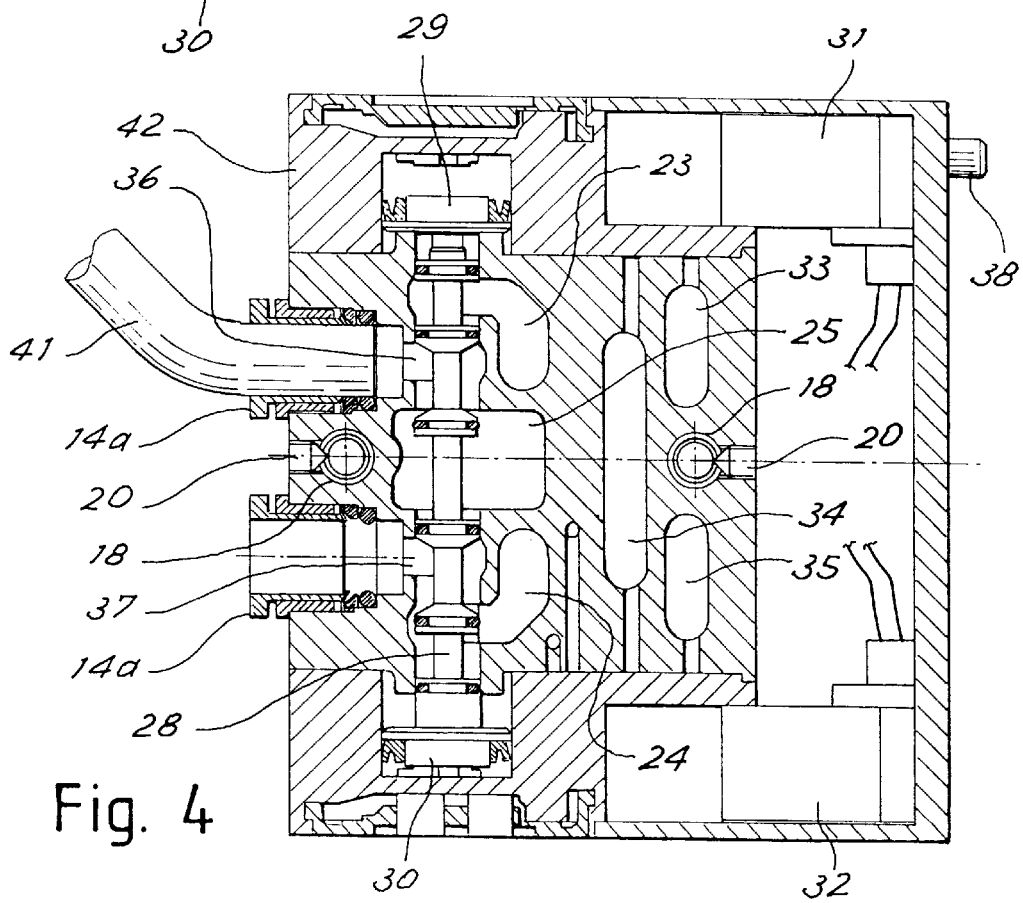

As viewed from FIGS. 1 and 2, where two modules (11a, 11b) of different flow rates are shown, modules of different flow rates have different thickness, while all other outer sizes are identical, so that each module can be juxtaposed with every other model, irrespective of the flow rate. As can be seen in FIGS. 3 and 4, the sections of a plane parallel to the mating faces are substantially identical for modules of different flow rate too. In particular, the feeding ducts 23, 24 and exhaust ducts 25 passing between the faces 21, 22 are identical for all modules in terms of sizes and positioning, so that each duct is sealingly connected with the corresponding ducts of the modules disposed in side by side relationship. Ducts 23, 24, 25 are sized for the highest flow rate, the space in the modules enabling it without any problem.

The through feeding duct 25 is connected with the through exhaust ducts 23, 24 by means of respective passages 26, 27. Controlled connection means connects the through ducts with the respective outlets. In the embodiment shown this means advantageously consists of a shuttle 28 axially slidable in the two ways by means of end pistons 29, 30 fed with fluid under pressure (via ducts not shown) by means of respective known pilot solenoid valves 31, 32. The fluid under pressure reaches the pilot solenoid valves by means of through ducts 33, 34, 35. Electric supply to the electromagnets is obtained for example by electric contacts 38 external to each module, to which terminals 39 are connected, which terminals are electrically connected by movable wires to a main multiple connector 40 disposed on the feeding head. Passages 26, 27 are connected to outlets 14 by ducts 36, 37.

Advantageously, in each valve unit the distance between the outlet centres is constant.

By its movement upwardly or downwardly, shuttle 28 performs switching-over functions and alternately connects ducts 36, 37 (and, as a results, the corresponding outlets 14) to the feeding or exhaust lines, as can be easily understood by a person skilled in the art. In FIGS. 3 and 4 the upper outlet 14 is shown connected to the feeding line whereas the lower outlet 14 is shown connected to the exhaust line. Modules of different flow rate have outlets 14 of different diameter (a greater outlet 14a and a smaller outlet 14b, for example). In an innovative manner, for feeding each outlet with the necessary flow rate it has been chosen that height "A" of ducts 36, 37 should be kept constant in a direction parallel to the module sides and that width "B" (for instance B1<B2) should be varied, so as to obtain a passage section in the ducts conveniently adjusted in proportion to the flow rate provided for the particular module, by only increasing the module thickness and not the other outer sizes of the module. This is clearly shown in FIG. 2, where the upper outlets have not been removed. While only two module types (each for a preestablished flow rate) have been shown in the drawings, by virtue of the above description it can be easily envisaged that modules for any flow rate can be accomplished, maintaining the modular character that enables all modules to be assembled together, mixing the modules of different flow rates at will, in terms of number and order, by merely disposing the selected modules in side by side relationship and locking them to each other by means of the fitting elements 17. At this point it is apparent that the intended aims have been achieved by providing a modular system of valves enabling compact valve batteries having mixed flow rates to be easily accomplished.

Obviously, the above description of an embodiment applying the innovative principles of the present invention is given by way of example only and therefore must not be considered as a limitation of the scope of the invention as herein claimed. For instance, the modular character remaining unchanged, the sizes and proportions of the different component parts can be varied depending on specific requirements.

What is claimed is:

1. A modular system to form valve batteries, comprising a plurality of valve units to be variously packed in side by side relationship to form the battery, each valve unit having a face on which outlets for users appear and, on opposite lateral mating sides of which through ducts appear which are intended for juxtaposing and connecting with corresponding ducts of units disposed in side by side relationship, each unit having valve means for controlled connection between the through ducts and the respective outlets, the valve units being made with a generally parallelepiped shape, the sizes of the mating sides being substantially constant for all units and the thickness of each unit intended as the distance between sides varying on varying of the maximum flow rate of the specific valve unit, thereby enabling a direct coupling between valve units having different maximum flow rates.

2. A modular system as claimed in claim 1, wherein in each unit connection between valve means and outlets takes place through ducts the section of which has a size (A) parallel to the sides which is generally constant for all units and a size (B) normal to the sides that varies on varying of the maximum flow rate, thereby enabling the section to be adjusted in proportion to the maximum flow rate of the specific unit by only varying the thickness of the valve unit.

3. A modular system as claimed in claim 1, wherein the valve means comprises a shuttle with its axis parallel to the sides and the front face and axially slidable in the two ways by means of end pistons fed with fluid under pressure by means of respective pilot solenoid valves.

4. A modular system as claimed in claim 1, wherein in each valve unit the distance between the outlet centres is constant.

5. A modular system as claimed in claim 1, wherein each unit has electric power supplied through conductors connected to a main multiple connector disposed on a first head element located at one end of the assembly formed of the units packed with each other, the head also constituting a connection between said through ducts of the units and main feeding and exhaust couplings.

6. A modular system as claimed in claim 5, wherein it comprises a further head element disposed on the opposite end of the assembly with respect to the first head element to constitute an end closure for said through ducts.

7. A modular system as claimed in claim 1, wherein between each unit and the unit disposed directly in side by side relationship, means for mutual fastening is arranged which consists of at least one bush projecting from a unit for fitting into a corresponding housing in the unit in side by side relationship, a projecting set piece being provided in the housing for locking the bush in the housing itself.

8. A modular system as claimed in claim 7, wherein the locking set piece is inserted into the corresponding bush at a circumferential V-shaped groove formed in the peripheral surface of the bush.

* * * * *